United States Patent [19]

Adonyi et al.

[11] Patent Number: 4,486,825

[45] Date of Patent: Dec. 4, 1984

[54] CIRCUIT ARRANGEMENT FOR EXTENDED ADDRESSING OF A MICROPROCESSOR SYSTEM

[75] Inventors: Iván Adonyi, Pécs; Endre Farkas, Budapest; Gyula Hegedüs, Baja; Attila Körmendy, Budapest; Istvánné Mogyorósi, Budapest; Géza Molnár, Budapest; Szilárd Sass, Budapest; László Schöller, Budapest; Lajos Takács, Budapest; György Vitéz, Budapest, all of Hungary

[73] Assignee: Telefongyár

[21] Appl. No.: 305,627

[22] PCT Filed: Jan. 12, 1981

[86] PCT No.: PCT/HU81/00001

§ 371 Date: Sep. 15, 1981

§ 102(e) Date: Sep. 15, 1981

[87] PCT Pub. No.: WO81/02071

PCT Pub. Date: Jul. 23, 1981

[30] Foreign Application Priority Data

Jan. 17, 1980 [HU] Hungary .................................. 83/80

[51] Int. Cl.³ ............................................. G06F 13/00
[52] U.S. Cl. .................................................... 364/200
[58] Field of Search ................................ 364/200, 900

[56] References Cited

U.S. PATENT DOCUMENTS

| | | | |
|---|---|---|---|
| 3,939,455 | 2/1976 | Toyosawa | 364/200 |
| 3,943,495 | 3/1976 | Garlic | 364/200 |
| 4,112,490 | 9/1978 | Pohlman et al. | 364/200 |

OTHER PUBLICATIONS

"Kiloband Microcomputing", Mar. 1979, pp. 108-112.
"Intel MCS-80/85 Family User's Manual", Oct. 1979, pp. 6-115 to 6-131.

Primary Examiner—James D. Thomas
Assistant Examiner—David L. Clark
Attorney, Agent, or Firm—Toren, McGeady and Stanger

[57] ABSTRACT

A microprocessor system including a microprocessor as the central processor unit and having memory read and memory write control outputs and peripheral device read and peripheral device write control outputs. The system also includes a peripheral device and a memory connected to the microprocessor via data-, address- and control buses and provided with read and write control inputs. The system employs combinational logic circuits for controlling the interconnections of the various system devices with the microprocessor in a predetermined way.

2 Claims, 1 Drawing Figure

CIRCUIT ARRANGEMENT FOR EXTENDED ADDRESSING OF A MICROPROCESSOR SYSTEM

FIELD OF THE INVENTION

This invention relates to a microprocessor system comprising a microprocessor forming a central processor unit which is provided with control outputs for memory read, memory write, peripheral device read and peripheral device write, comprising furthermore a memory and a peripheral device provided with read and write control inputs connected to the microprocessor via a data bus, an address bus and a control bus.

BACKGROUND OF THE INVENTION

A microprocessor system of the above type is described for example in the INTEL 8080 Microcomputer Systems User's Manual, Volume 9, 1975 [see FIGS. 3-9 in pages 3-8].

In this system, the memory read and memory write, peripheral device read and peripheral device write outputs of the microprocessor are connected to the corresponding read and write inputs of the memory elements and peripheral devices. The microprocessor controls the peripheral devices by means of peripheral device handler instructions created especially for this purpose. This solution is disadvantageous in the respect that in the system the peripheral devices performing the same function but having necessarily different addresses can not be addressed and handled with a single program— hence a peripheral device handler instruction may refer only to a single peripheral device address—, consequently these programs should be multiplicated. A further disadvantage is that by means of the peripheral device handler instructions the data are accessible only through a special register, i.e. the so called accumulator register of the microprocessor.

In the abovementioned publication, the authors attempted to eliminate this disadvantage by using a system shown in FIGS. 3-10 in pages 3-9. In this solution, the peripheral devices are selected via the memory read and memory write outputs gated with the most significant bit of the address bus, rather than via the peripheral device read and write outputs of the microprocessor. In this way, the peripheral devices can be addressed in the system as memory cells, and in the program the peripheral devices should be handled with references to these memory cell addresses. This solution has the disadvantage, on one hand that memory reference instructions having longer execution time and greater memory area requirement should be used, even when it would be unnecessary, for example when peripheral devices are to be handled which are unique in the system concerning their types. A further disadvantage lies, on the other hand, in that, in this case, the peripheral device handler instructions of the microprocessor can not be used at all, therefore the programs containing such types of instructions—which programs are developed up to now in a great number—can not be used without modifications. These disadvantages restrict to a great extent the usability of such systems, limit their application areas.

The aim of the present invention is to eliminate these disadvantages.

The object of the present invention is to provide a microprocessor system in which the memory requirement and run time of the programs are minimal, and which at the same time allows the execution of programs made for known systems without modifications.

SUMMARY OF THE INVENTION

According to the present invention, a microprocessor system comprises a microprocessor forming the central processor unit provided with memory read and memory write control outputs and peripheral device read and peripheral device write control outputs, comprises furthermore a peripheral device and a memory connected to the microprocessor via data-, address- and control buses and provided with read and write control inputs; said microprocessor system comprises a combination logic circuit provided with a first, second, third, fourth and fifth inputs and a first and second outputs; the memory read control output of the microprocessor is connected with the second input of the first combination logic circuit and with the read control input of said memory, the memory write control output of the microprocessor is connected with the third input of the first combination logic circuit and with the write control input of said memory, the peripheral device read control output of the microprocessor is connected with the fourth input of the first combination logic circuit, the peripheral device write control output of the microprocessor is connected with the fifth input of the first combination logic circuit; at least one selected address bus line of the output address bus lines of the microprocessor is connected with the first input of the first combination logic circuit; the first output of the first combination logic circuit is connected with the read control input of said peripheral device, its second output with the write control input of said peripheral device; and the first combination logic circuit is constructed—in a manner known in itself—so that in the case of the logic "truth" state of the first input of the first logic circuit, the logic state of the first output thereof is identical with the logic OR-relation of the logic states of the second and fourth inputs thereof, and the logic state of the second output thereof is identical with the logic OR-relation of the logic states of the third and fifth outputs thereof, and in the case of the logic "false" state of the first input thereof, the logic state of the first output is identical with the logic state of the fourth input, the logic state of the second output thereof is identical with the logic state of the fifth input.

According to the present invention, in a preferred embodiment the microprocessor system comprises a second combination logic circuit provided with a first, second and third inputs and a first and second outputs; the first input is connected with at least one address bus line selected from the output address bus lines of the microprocessor, the second input is connected with the memory read control output of the microprocessor, the third input is connected with the memory write control output of the microprocessor, the first output is connected with the memory read control input thereof and the second output with the memory write control input; and the second combination logic circuit is constructed—in a manner known in itself—so that in the case of the logic "false" state of the first input thereof the logic state of the first output is identical with the logic state of the second input, and the logic state of the second output is identical with the logic state of the third input, in the case of the logic "truth" state of the first input, the logic states of the first and second outputs are, independently from the signals applied to the second and third inputs, logic "false".

The system according to the invention allows a data transmission between the microprocessor and the peripheral devices during the run time, in accordance with the current demands at any time either in the usual way, or in such a way that the peripheral devices are used as memories, obtaining by this an optimal run time and memory occupation.

According to the invention, the programs made for known systems can be used in our system as well, in addition, it allows more adaptive programming, also the specific costs are lower.

The invention will now be described, by way of non-limitative example only, with reference to the accompanying drawing, on which the block-diagram of the microprocessor system according to the invention is shown.

BRIEF DESCRIPTION OF THE DRAWINGS

In the FIGURE, the overall system is shown which comprises a microprocessor 1, a memory 2 and a peripheral device 3. For the sake of simplicity, both the memory 2 and the peripheral device 3 are illustrated as single units. In practice, these consist ordinarily of several (generally a great number of) units.

DESCRIPTION OF THE PREFERRED EMBODIMENTS

Figure 1:
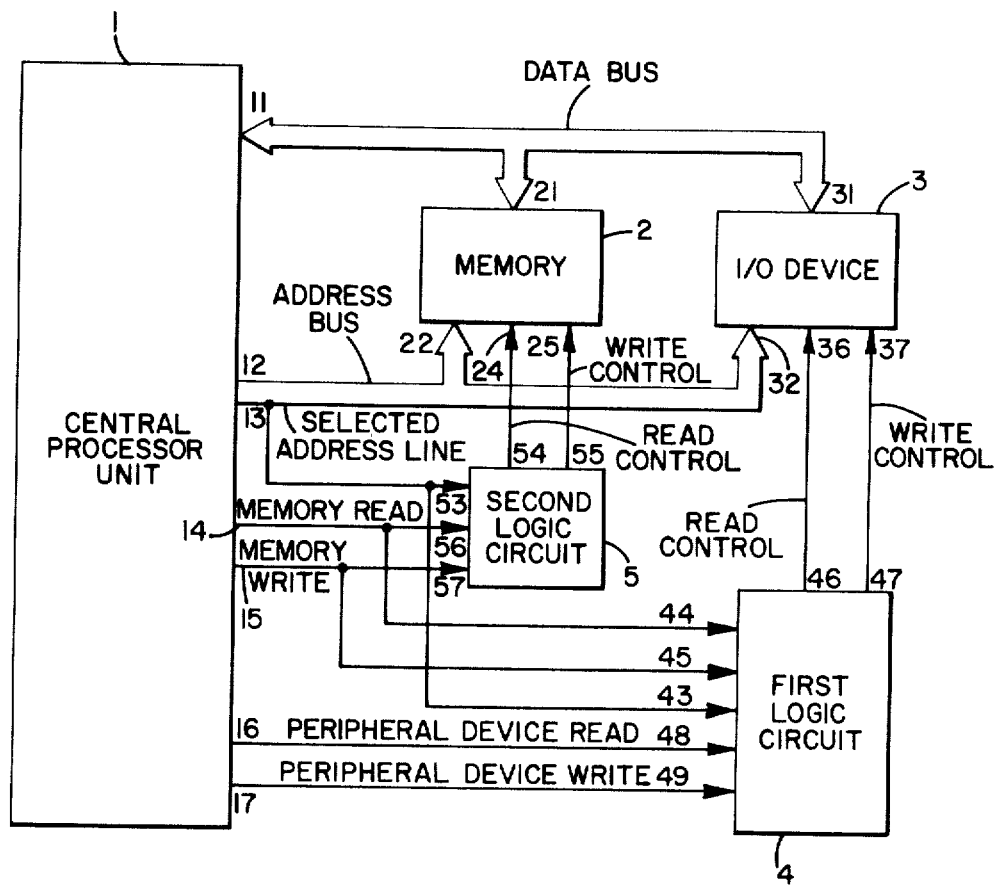

The microprocessor 1 is provided with data bus lines 11, which are connected with both the data bus lines 21 of the memory 2 and the data bus lines 31 of the peripheral device 3. At the same time the microprocessor 1 is provided with output address bus lines 22, which are connected with the input address bus lines 22 of the memory 2 and with the input address bus lines 32 of the peripheral device 3.

From among the output address bus lines 12 of the microprocessor 1 an arbitrarily selected address bus line 13 is connected with a first input 43 of a first combination logic circuit 4 and with a first input 53 of a second combination logic circuit 5.

The microprocessor 1 is provided with a memory read control output 14, a memory write control output 15, a peripheral device read control output 16 and a peripheral device write control output 17, these are parts of the control bus lines of the microprocessor 1, the peripheral device 3, the first combination logic circuit 4 and the second combination logic circuit 5. The output 14 is connected to the input 56 of the second combination logic circuit 5 and to the second input 44 of the first combination logic circuit 4. The output 15 is connected to the third input 57 of the second combination logic circuit 5 and to the third input 45 of the first combination logic circuit 4. The output 16 is connected to the fourth input 48 of the first combination logic circuit 4, the output 17 to the fifth input 49 of the first combination logic circuit 4. The microprocessor 1 is constructed so that, at the same time, only one of the outputs 14, 15, 16 and 17 thereof can be in logic "true" state.

The memory 2 is provided with a read control input 24 and a write control input 25. The input 24 is connected to the first output 54 of the second combination logic circuit 5, the input 25 is connected to the second input 55 of the second combination logic circuit 5.

The peripheral device 3 is provided with a read control input 36 and a write control input 37. The input 36 is connected to the first output 46 of the first combination logic circuit 4 and the input 37 to the second output 47 of the first combination logic circuit 4.

The microprocessor system according to the present invention is different from the known systems in the usage of the first combination logic circuit 4 and the second combination logic circuit 5, i.e. in the structure of the connection thereof with the microprocessor 1, the memory 2 and the peripheral device 3.

In the shown example the data transmission via the data bus lines 11, 21 and 31 of the microprocessor system is carried out in the usual way, and the status of the address bus lines 12, 22 and 32 define too in the usual way the numeric identifiers of the elements in the system, i.e. the addresses thereof.

The difference between the known systems and the microprocessor system according to the present invention lies in the following.

The logic "true" state of the selected output address line 13 of the microprocessor 1 disables via the first input 53 of the second combination logic circuit 5 the appearance of the signals of the second input 56 and the third input 57 of the second combination logic circuit on the first output 54 and the second output 55, at the same time the same/selected address line 13 enables via the first input 43 of the first combination logic circuit 4 the appearance of the signals of the second input 44 and the third input 45 on the first output 46 and the second output 47.

The signals of the fourth input 48 and the fifth input 49 of the first combination logic circuit 4 appears in any case, independently from the logic state of the selected address bus line 13, on the first output 46 and the second output 47.

In this way, the microprocessor controls the peripheral device 3 so that besides the input/output instructions memory reference instructions referring to addresses, on which the logic state of the selected address bus line 13 is "true", are also effective.

However, when the logic state of the selected output address bus line 13 of the microprocessor (and of the first input 53 of the second combination logic circuit 5) is "false", the signals of the second input 56 and the third input 57 of the second combination logic circuit 5 appear on the first output 54 and the second output 55, at the same time the same selected address bus line 13 disables via the first input 43 of the first combination logic circuit 4 the appearance of the signals of the second input 44 and the third input 45 on the first output 46 and the second output 47. In this way, the system is capable to transfer data between the microprocessor 1 and the memory 2 and peripheral device 3 in the usual way.

We claim:

1. A microprocessor system comprising:
    a microprocessor forming a central processor unit and provided with control outputs for memory read, memory write, peripheral device read and peripheral device write;
    a memory;
    a peripheral device provided with read and write control inputs, connected to said microprocessor via a data bus, an address bus and a control bus;
    said microprocessor system including a first combination logic circuit provided with a first input, a second input, a third input, a fourth input and a fifth input, a first output and a second output;
    the memory read control output of said microprocessor being connected to the second input of said first combination logic circuit and operatively connected to a read control input of said memory, the memory write control output of said microprocessor being connected to the third input of said first combination logic circuit and operatively connected to write control input of said memory, the peripheral device read control output of said microprocessor being connected to the fourth input of said first combination logic circuit, the peripheral device write control output of said microprocessor being connected to the fifth input of said combination logic circuit;

at least one selected address bus line from among the output address bus lines of said microprocessor being connected to the first input of the first combination logic circuit;

the first output of the first combination logic circuit being connected to the read control input of said peripheral device, the second output thereof being connected to the write control output of the peripheral device; and the first combination logic circuit including in the case when the logic state of the first input thereof is "true", means for making the logic state of the first output be identical with the logic "OR"-relation of the logic states of the second input and the fourth input thereof, the logic states of the second output be identical with the logic "OR"-relation of the third input and the fifth input, and, when the logic state of the first input thereof is logic "false", for making the logic state of the first output be identical with the logic state of the fourth input and the logic state of the second output be identical with the logic state of the fifth input thereof.

2. A microprocessor system according to claim 1, further comprising:

a second combination logic circuit, providing said operative connection, provided with a first input, a second input and a third input, a first output and a second output;

the first input being connected to at least one selected address bus line from among the output address bus lines of said microprocessor, the second input being connected to the memory read control output of said microprocessor, the third input being connected to memory write control output of said microprocessor, the first output being connected to the read control input of said memory, the second output being connected to the write control input of said memory; and said second combination logic circuit including, in the case when the logic state of the first input thereof is logic "false", means for making the logic state of the first output be identical with the logic state of the second input and the logic state of the second output be identical with the logic state of the third input, and when the first input is in logic "true" state, for making the logic states of the first output and the second output be, independently from the logic states of the second input and the third input, logic "false".

* * * * *